United States Patent
Kiyose et al.

(10) Patent No.: US 6,525,445 B2
(45) Date of Patent: Feb. 25, 2003

(54) PLANE COMMUTATOR AND METHOD OF MANUFACTURING THE SAME

(75) Inventors: Kenzo Kiyose, Takahama (JP); Kiyotoshi Oi, Anjo (JP); Yoshio Ebihara, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/823,745

(22) Filed: Apr. 3, 2001

(65) Prior Publication Data

US 2001/0030485 A1 Oct. 18, 2001

(30) Foreign Application Priority Data

Apr. 13, 2000 (JP) .......................... 2000-112527

(51) Int. Cl.⁷ .......................... H02K 1/00; H02K 13/04; H01R 39/06; H01R 39/52
(52) U.S. Cl. .......................... 310/233; 310/235; 310/237
(58) Field of Search .......................... 310/235, 233, 310/234, 236, 237

(56) References Cited

U.S. PATENT DOCUMENTS

| | | | | |
|---|---|---|---|---|
| 3,983,431 A | * | 9/1976 | Hancock | 310/233 |
| 4,726,113 A | * | 2/1988 | Shibata et al. | 29/597 |
| 5,157,299 A | * | 10/1992 | Gerlach | 310/237 |
| 5,245,240 A | * | 9/1993 | Takasaki | 310/237 |
| 5,422,528 A | * | 6/1995 | Prahl | 310/235 |
| 5,629,576 A | * | 5/1997 | Shimoyama | 310/235 |
| 5,637,944 A | * | 6/1997 | Shimoyama | 310/237 |
| 5,677,588 A | * | 10/1997 | Strobl | 310/237 |
| 6,242,838 B1 | * | 6/2001 | Kiyose et al. | 310/233 |
| 6,259,183 B1 | * | 7/2001 | Hotta et al. | 310/233 |
| 2001/0024074 A1 | * | 9/2001 | Kiyose et al. | 310/237 |

FOREIGN PATENT DOCUMENTS

| | | | | |
|---|---|---|---|---|
| GB | 2226460 A | * | 6/1990 | |
| JP | 406013147 A | * | 1/1994 | |
| JP | 408308183 A | * | 11/1996 | |

* cited by examiner

Primary Examiner—Nestor Ramirez
Assistant Examiner—Julio Gonzalez R.
(74) Attorney, Agent, or Firm—Nixon & Vanderhye, PC

(57) ABSTRACT

A plane commutator includes a plurality of commutator segments made of carbon compound, a resinous boss member having a body portion supporting a base portion of the commutator segments and an outer peripheral portion supporting an outer periphery of the same and a plurality of metal base plates. Each metal base plate has a contact portion in contact with the base portion of the commutator segment, an axial portion extending along a peripheral portion of the boss member and a terminal portion. The axial portion of the metal base plates is disposed on an outer periphery of the plane commutator in parallel with the outer peripheral portions of the boss member to separate the outer peripheral portion from the body portion. The outer peripheral portion moves freely from the body portion as the metal base plates thermally expand.

7 Claims, 4 Drawing Sheets

PLANE COMMUTATOR AND METHOD OF MANUFACTURING THE SAME

CROSS REFERENCE TO RELATED APPLICATION

The present application is based on and claims priority from Japanese Patent Application 2000-112527 filed Apr. 13, 2000, the contents of which are incorporated herein by reference.

BACKGROUND OF THE INVENTION

1. Field of the Invention

The present invention relates to a plane commutator that has a disk-like commutator surface and a method of manufacturing such a commutator.

2. Description of the Related Art

A plane commutator that has a flat commutator surface is installed in a motor such as a motor of a motor-integrated fuel-pump unit. The plane commutator is comprised of a plurality of commutator segments made of a sintered carbon compound and insulated by slits from each other, a plurality of metal base plates, and a resinous boss member. The plurality of the commutator surface forms a flat commutator surface, and each of the commutator segments is connected to one of the metal base plates. Because the commutator segments are made of a sintered carbon compound, it is difficult to adopt heat treatment by fusing to a mass production line of the above plane commutators.

JP-A-9-46978 discloses a plane commutator which is comprised of a plurality of commutator segments, a metal base plate and a resinous boss member. The metal base plate has a contact portion in contact with the commutator segments at the surface opposite the commutator surface thereof, axial portions extending along the outer periphery of the boss member and terminal portions. The contact portion of the metal base plate has a plurality of openings in which resinous material is filled.

However, when an end of an armature winding of a motor is connected to the terminal portion by fusing, the axial portion thermally expands and gives stress on the peripheral portion of the resinous boss member, which may be damaged and broken.

For example, if the axial portion that is enclosed by a resinous material of the boss member expands in circumferential directions of the boss member, the resinous material may be cracked or damaged by the axial portion.

SUMMARY OF THE INVENTION

Therefore, a main object of the invention is to provide a plane commutator that may not be damaged even if the axial portion of the metal base member thermally expands.

In a plane commutator according to a main feature of the invention, includes a plurality of commutator segments made of carbon compound, a resinous boss member and a plurality of metal base plates, axial portions of the metal base plates are disposed on the outer periphery of the plane commutator in parallel with the outer peripheral portion of the boss member to separate the outer peripheral portion from the body portion of the boss member. Since the outer peripheral portion of the boss member is separated from the body portion of the boss member, the outer peripheral portion can move freely from the body portion and little stress is given even if the metal base plates thermally expand.

In a plane commutator according to another feature of the invention, the boss member includes a plurality of bridge portions extending in a direction substantially perpendicular to a direction of thermal expansion of the axial portion of the metal base plates to connect the outer peripheral portion and the body portion inside the axial portions of the metal base plates. Since the bridge portion is flexible, the outer peripheral member can move comparatively freely from the body portion, while the outer peripheral portion is more tightly anchored to the body portion.

According to another feature of the invention, a method of manufacturing a plane commutator including the following steps: soldering a disk member made of a sintered carbon compound to a cylindrical metal member to form a unit in which a base portion of the disk member is in contact with a contact portion of the cylindrical member; putting the unit into a mold die to mold the unit with resinous material to form a boss member; forming a bridge portion extending perpendicular to the axial portion of the cylindrical metal member to connect the body portion and the outer peripheral portion inside the axial portion; forming a plurality of radial slits in the disk member and the cylindrical member.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1A:
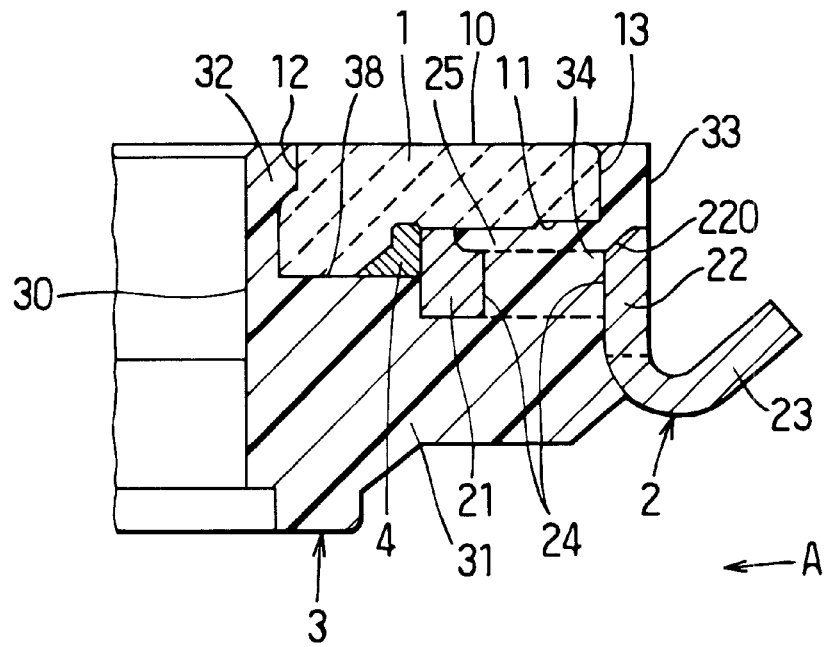
FIG. 1A is a half cross-sectional side view of a plane commutator according to a first embodiment of the invention, taken along line 1A—1A in FIG. 6.

A plane commutator of a motor to be installed in a fuel pump unit according to a first embodiment of the invention is described with reference to FIGS. 1 and 2.

The plane commutator is comprised of a plurality of commutator segments 1, a plurality of metal base plates 2 and a resinous boss member 3.

The plurality of the commutator segments 1 is made of a sintered carbon compound and disposed in radial directions at equal intervals to form, as a whole, a disk-like member having a commutator surface 10 at an end thereof and a base portion 11 at the other end.

Each metal base plate 2 is disposed to correspond to one of the commutator segments 1. Each metal base plate 2 has a contact portion 21, an axial portion 22 and a terminal portion 23. The contact portion 21 is soldered by solder 4 to one of the commutator segments 1 at the base portion 11, as in the second embodiment shown in FIG. 3. The axial portion 22 extends downward from the contact portion 21 along the outer periphery of the boss member 3, and the terminal portion extends from the axial portion 22 radially outward and upward. A winding end of an armature winding is to be connected to the terminal portion 23 by fusing, soldering or the like.

The boss member 3 is comprised of a body portion 31 (first support portion), an inner peripheral portion 32, an outer peripheral portion 33 (second support portion), and a plurality of bridge portions 34.

The body portion 31 supports the base portion 11 of the plurality of commutator segments 1. The inner peripheral portion 32 supports the inner periphery of the plurality of segments 1.

The outer peripheral portion 33 is disposed on the outer periphery of the commutator in parallel with the axial portions 22 or to overlap the axial portions 22 in the radial direction to support the outer periphery of the plurality of the commutator segments 1.

Figure 1B:
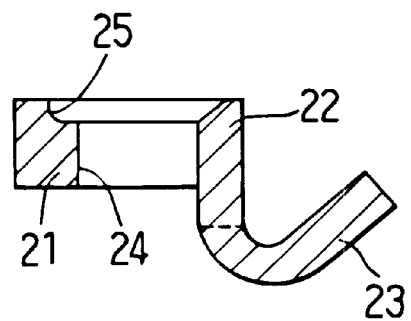
FIG. 1B is a half cross-sectional view of a metal base plate.

Each contact portion 21 has two stage openings 24, 25, as shown in FIG. 1B, in which resinous material is filled, as shown in FIG. 1A. The larger and upper opening 25 is connected to a corner-cut portion 220 of the axial portion 22 so that the bridge portion 34 can connect the body portion 31 and the outer peripheral portion 33 through the corner-cut portion 220. In other words, the bridge portions 34 are respectively formed inside the metal base plates 2 to have a cross-section to provide a sufficient elasticity in the direction perpendicular to the axial direction in which the metal base plate thermally expands. The corner-cut portion 220 has a slanting surface to prevent the bridge portion 34 from being cut.

Figure 2:
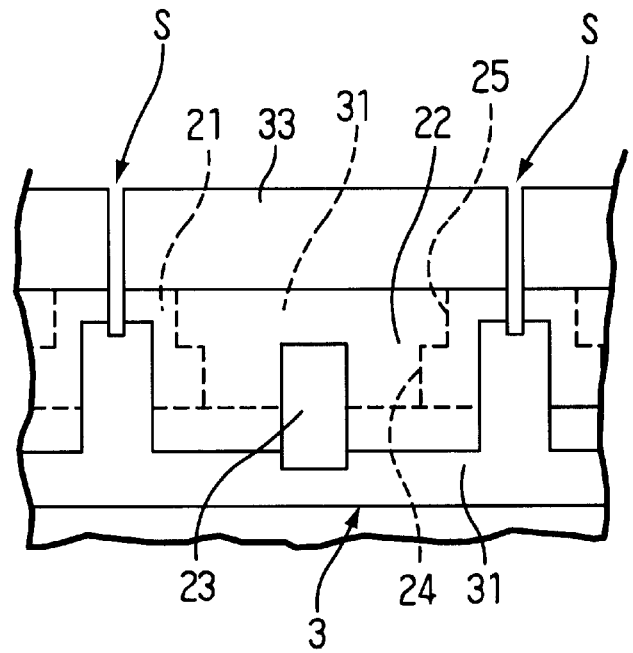
FIG. 2 is a fragmentary side view of the plane commutator shown in FIG. 1 viewed from position A.

As shown in FIG. 2, the body portion 31 and the outer peripheral portion 33 are separated from each other by the axial 20 portions 22 and the slits s at the outer surface of the commutator although they are connected by the bridge portions 34 at portions inside the metal base plates 2.

Even if the axial portions 22 thermally expand when a winding end is fused to the terminal portions 23, the outer 25 peripheral portion 33, which is only connected to the body portion 31 by the bridge portions 34, can move relative to the body portion 31 and moderate the stress because the bridge portion bends to follow the motion of the outer peripheral portion 33 caused by the axial portions 22. Even if some of the bridge portions 34 are cut off, there is little problem.

The commutator segments 1 and contact portions 21 of the metal base plates 2 are disposed in cavities 38 of the boss member 3. The circumferential ends of each cavity 38 respectively face slits S. The boss member 3 has a shaft hole 30 at the center thereof. Therefore, the boss member 3 covers all the portions of the metal base plates 2 except the commutator surface and the surfaces thereof facing the slits S.

In manufacturing, a disk member made of a sintered carbon compound that corresponds to a plurality of the commutator segments 1 is soldered by a solder 4 to a cylindrical metal member that corresponds to a plurality of the metal base plates so that the base portion 11 is in contact with the contact portion 21. Thereafter, the disk member and the cylindrical member in a unit is inserted into a mold die to mold the unit with resinous material and to form the boss member 3. At this step, the axial portion of the cylindrical member is disposed on the outer periphery of the boss member 3. Finally, a plurality of slits s is formed in radial directions of the disk member and the cylindrical member to form a plurality of the commutator segments 1 and a plurality of the metal base plates 2, as shown in FIG. 2. A shaft (not shown) of a motor is to be inserted into the shaft hole 30 and a wire end of an armature coil is to be welded to each terminal portion 23.

Figure 5:
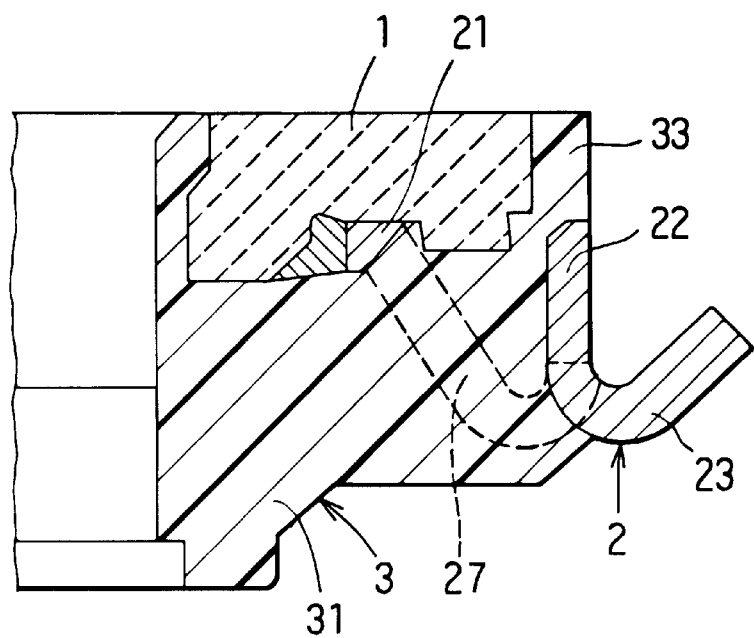
FIG. 5 is a half cross-sectional side view of a plane commutator according to a variation of the first embodiment of the invention.
Figure 6:
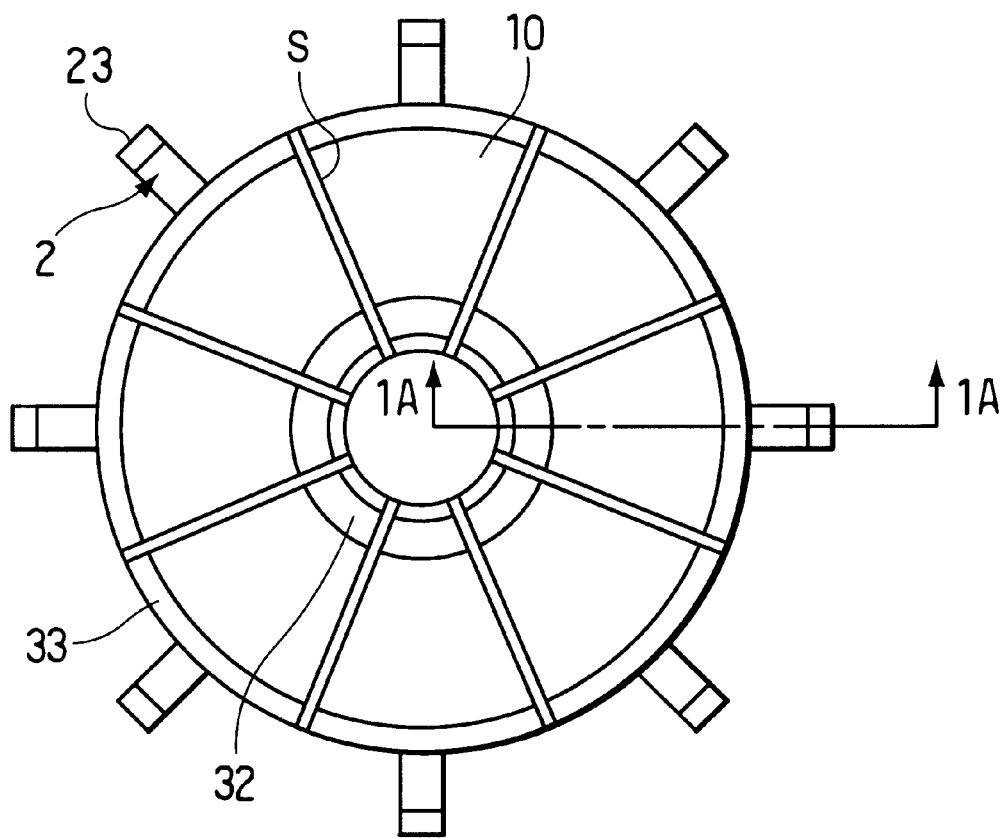
FIG. 6 is a plan view of the commutator according to the first embodiment of the invention.

As a variation of the metal base member, the contact portion 21 is connected to the axial portion 22 by a diagonally extending member 27, as shown in FIG. 5. This metal member makes the resinous material of the boss member 3 to form the bridge portion 34 more easily.

In the meantime, the same reference numeral in the following drawings represents the same or substantially the same portion or part as the first embodiment.

Figure 3:
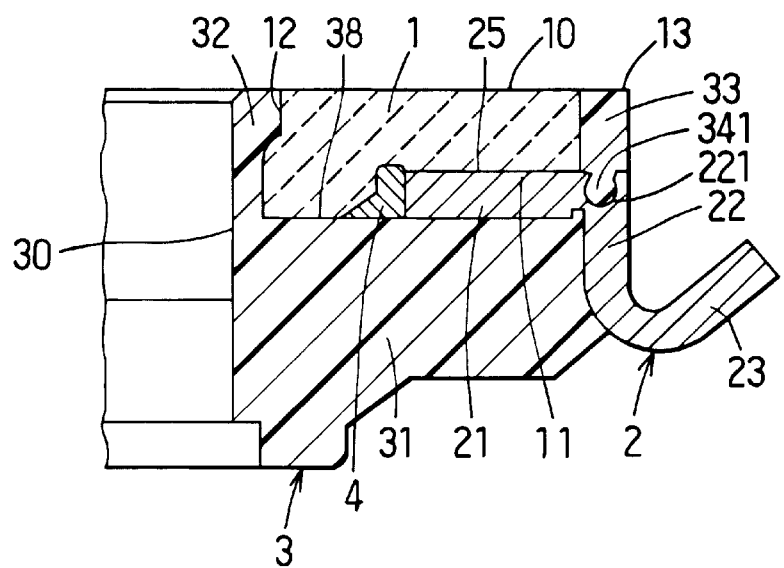
FIG. 3 is a half cross-sectional side view of a plane commutator according to a second embodiment of the invention.

A plane commutator according to a second embodiment of the invention is described with reference to FIG. 3.

Instead of the bridge portion 34, a root portion 341 is formed in a cavity (or groove) 221 formed at a surface of the axial portion adjacent the outer peripheral portion 33. The cavity 221 has a neck at the opening thereof to hold the root portion 341 tight. The outer periphery of the commutator segments 1 in contact with the outer peripheral portion 33 is roughened to increase the adhesive strength.

Because the outer peripheral portion 33 is completely separated from the body portion 31, the outer peripheral portion 33 can move more easily as the axial portions 22 of the metal base plates 2 expand.

Figure 4:
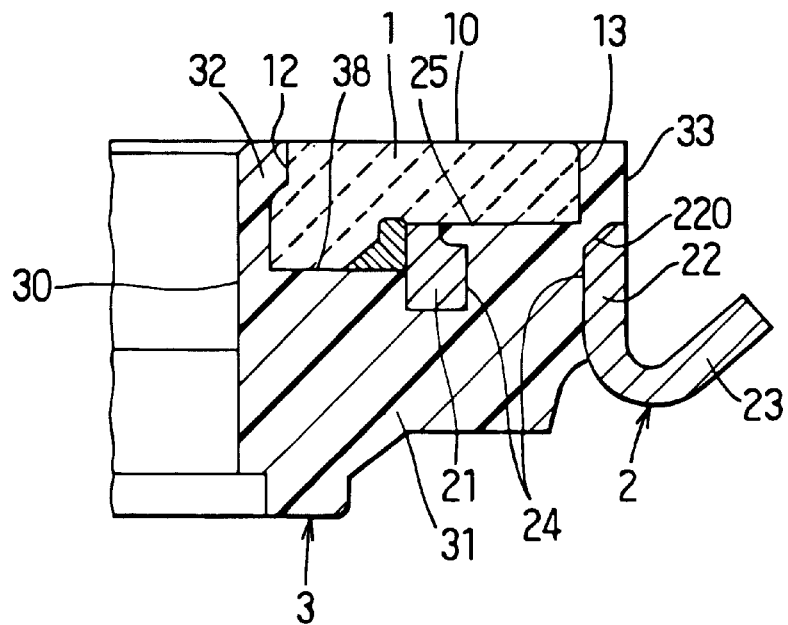
FIG. 4 is a half cross-sectional side view of a plane commutator according to a third embodiment of the invention.

A plane commutator according to a third embodiment of the invention is described with reference to FIG. 4. The contact surface of the body portion 31 with the axial portion 22 at the side thereof remote from the outer peripheral portion 33 is reduced, thereby reducing strength of the body portion 31 of holding the axial portion 22 at the side remote from the outer peripheral portion 33. As a result, the axial portion may thermally expands downward so that a stress due to the expansion is not applied to the outer peripheral portion 33.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A plane commutator comprising:

a plurality of commutator segments made of carbon compound and having a commutator surface at one end thereof, a commutator segment outer periphery at an outer side thereof, and a base portion at the other end thereof;

a resinous boss member having a first support portion supporting said base portion of said plurality of commutator segments, a second support portion supporting said outer periphery of said plurality of commutator segments, and a plurality of bridge portions connecting said first and second support portions; and a plurality of metal base plates, each said base plate having a contact portion in contact with said base portion of a respective one of said commutator segments, an axial portion extending from said contact portion along an outer peripheral portion of said first support portion, an opening in which one of said bridge portions is filled between said first and second support portions and a terminal portion extending radially outwardly from said axial portion; wherein said axial portion is disposed in parallel to said commutator outer periphery and adjacent said second support portion so that said axial portion and said second support portion define respective portions of an outer peripheral surface of the plane commutator, and wherein said first support portion and said second support portion are separated from each other throughout an extent of said outer peripheral surface of the plane commutator by said axial portion.

2. The plane commutator as claimed in claim 1, wherein said axial portions of said metal base plates are supported by said boss member so that said axial portions can move in a direction away from said commutator surface.

3. The plane commutator as claimed in claim 1, wherein said first support portion of said boss member comprises a portion engaging said terminal portion.

4. The plane commutator as in claim 1, wherein said plurality of commutator segments are circumferentially separated by a plurality of face slits that extend axially through said second support member and between the respective circumferentially adjacent metal base plates, to said first support member.

5. The plane commutator as in claim 1, wherein said second support portion is in contact with said axial portion of said metal base plates.

6. The plane commutator as in claim 1, wherein said opening through said metal base plate is defined in plural stages of differing diameter.

7. The plane commutator as in claim 1, wherein said first support portion and second support portion are connected solely by said bridge portions.

* * * * *